(12) United States Patent
Vandeweghe et al.

(10) Patent No.: US 6,399,122 B2
(45) Date of Patent: Jun. 4, 2002

(54) YOGURT PRODUCTION PROCESS

(75) Inventors: Philippe Vandeweghe, Plymouth; Penny Norquist, St. Paul; Erica Flynn, Circle Pines, all of MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 09/770,555

(22) Filed: Jan. 26, 2001

Related U.S. Application Data

(60) Provisional application No. 60/178,379, filed on Jan. 27, 2000, and provisional application No. 60/178,238, filed on Jan. 26, 2000.

(51) Int. Cl.[7] .................................................. A23C 9/12
(52) U.S. Cl. ............................. 426/43; 426/34; 426/42; 426/583
(58) Field of Search .............................. 426/34, 42, 43, 426/580, 583, 573, 576, 578

(56) References Cited

U.S. PATENT DOCUMENTS

| 4,416,905 | A | * | 11/1983 | Lundstedt et al. | 426/34 |
| 4,590,077 | A |   | 5/1986  | Trop             | 426/61 |
| 4,624,853 | A |   | 11/1986 | Rudin            | 426/61 |
| 4,837,036 | A | * | 6/1989  | Baker et al.     | 426/43 |
| 5,820,903 | A |   | 10/1998 | Fleury et al.    | 426/74 |

* cited by examiner

*Primary Examiner*—Leslie Wong
(74) *Attorney, Agent, or Firm*—Barnes & Thornburg

(57) ABSTRACT

The present invention relates to a process for decreasing the time required for production of yogurt without compromise of product quality. More particularly, the invention relates to a process for decreasing the time required for yogurt production without compromise of quality by fermentation at about 105° F. to about 115° F. followed by direct acidification. The yogurt composition is directly acidified when the pH of the composition reaches a pH of about 4.8 to about 5.2. The composition can be acidified while the temperature is at about 105° F. to about 115° F., or the composition can be acidified during or after cooling.

13 Claims, 1 Drawing Sheet

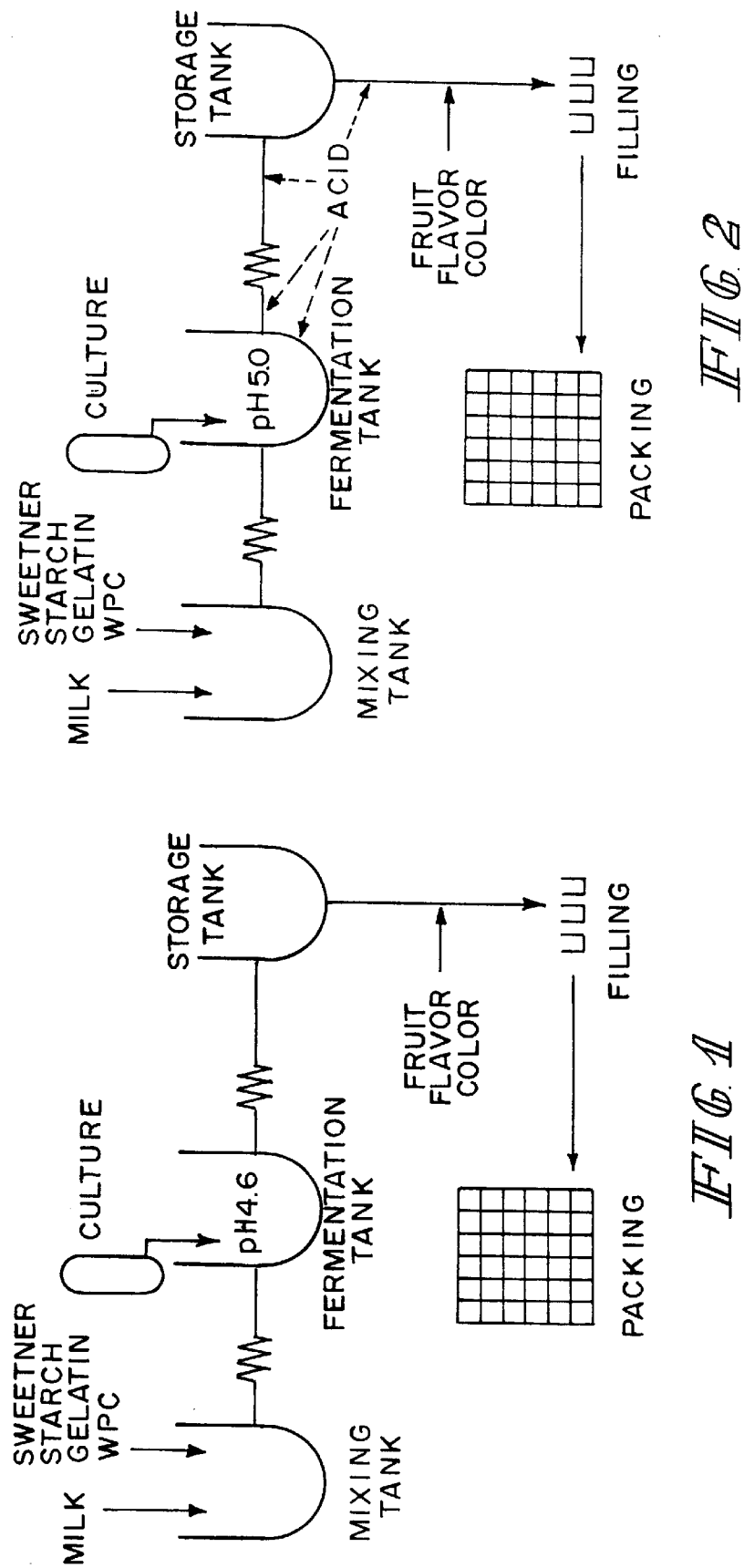

YOGURT PRODUCTION PROCESS

CROSS REFERENCE TO RELATED APPLICATIONS

This application claims priority under 35 U.S.C. §119(e) to U.S. Provisional Application No. 60/178,238, filed Jan. 26, 2000, and to U.S. Provisional Application No. 60/178,379, filed Jan. 27, 2000, which are expressly incorporated by reference herein.

FIELD OF THE INVENTION

The present invention relates to a process for decreasing the time required for production of yogurt without compromise of product quality. More particularly, the invention relates to a process for decreasing the time required for yogurt production without compromise of quality by fermentation at about 105° F. to about 115° F. followed by direct acidification.

BACKGROUND AND SUMMARY OF THE INVENTION

Over the last few years, yogurt and its preparations have developed into one of the most well-accepted and consumed fermented dairy products. A mildly acidic taste, good digestibility, variations in taste, and a high dietetic value have significantly contributed to this increased marketplace acceptance.

Yogurt is a firm, creamy or liquid acidified milk product which is manufactured from milk or a milk component by using thermophilic lactic acid bacteria. For increasing dry matter content, milk can be concentrated or powdered milk can be added during the production process. Exemplary of forms of yogurt are a gel-like form, stirred yogurt, and drinking yogurt in a liquid form.

The typical yogurt manufacturing process is depicted in FIG. 1. Basic yogurt manufacturing processes generally use a dairy medium such as milk or a milk component as starting material. The dairy medium is typically chosen from, but is not limited to, pasteurized or unpasteurized milk, cream, non-fat dried milk or concentrated milk and water. Other ingredients, such as various thickening agents/stabilizers (e.g., hydrocolloids such as starches or gelatins), and/or whey protein concentrates can optionally be added to adjust gel structure and/or consistency and the mixture is then heated to allow pasteurization and thickening. To this mixture is added yogurt-producing bacterial culture(s), and fermenting proceeds under heated conditions until the mixture reaches the required level of acidity to produce the yogurt. Fruit, flavorings, or colorants can optionally be added to the yogurt to produce the final commercial product.

During the yogurt production process, the rate limiting step is fermentation. Generally, the time period for the fermentation step is in the range of about two to about twelve hours, with most processes having fermentation steps that last approximately two to four hours. The present invention provides a new process by which the time necessary for this rate limiting fermentation step can be greatly decreased while producing a yogurt product with no compromise of quality (i.e. beneficial flavor, texture and other organoleptic qualities).

With respect to the dairy medium used in typical yogurt producing processes, certain percentages of fat and dry matter are chosen depending upon the final product desired. In order to obtain the desired gel structure in the yogurt with the desired consistency, the natural nonfat dry matter content can be adjusted by either addition of dry matter or by proper selection of the dairy medium starting material. For example, low-fat or skim milk yogurt has a softer gel than a whole milk yogurt; therefore, the dry matter content can be raised by addition of dry matter such as milk concentrate or milk powder or by water removal through evaporation.

Typically, optional ingredients are added to the dairy medium to adjust gel properties. For example, a typical process would use a starting mixture containing whey protein concentrate in the range of 0 to about 2%, a starch component in the range of 0 to about 5%, a sweetener in the range of 0 about 20%, a gelatin component in the range of 0 to about 3%, with the remainder of the mixture being the dairy medium (e.g., milk or milk components).

Once the dairy medium has been chosen, and optional ingredients desired are added, the mixture is generally heated to cause pasteurization and to denature whey protein. This pasteurization and thickening is generally accomplished by heating the mixture to about 180° F. to about 200° F. for about 2 to about 12 minutes, typically about 6 to about 9 minutes. After this heating step, the mixture is typically allowed to cool to about 105° F. to about 115° F. and placed into a fermentation tank wherein the temperature is continually maintained within the range of about 105° F. to about 115° F., yogurt culture is added and fermentation takes place until the mixture reaches appropriate levels of acidity. The acidification causes the coagulation of proteins that is responsible for the typical yogurt texture, and the typical yogurt flavor develops during acidification.

Starter cultures for yogurt generally are thermophilic (heat-loving) bacteria. Typical yogurt cultures are *Streptococcus thermophilus* and *Lactobacillus bulgaricus*. These bacteria are used in yogurt production because they can thrive and produce lactic acid at the temperatures used in conventional yogurt manufacturing. In the typical yogurt production process, fermentation proceeds until the pH of the mixture is below approximately 4.6. Below a pH of about 4.6 the final product is considered a high acid food and the product will not support growth of pathogenic bacteria. As previously described, this fermentation step is lengthy, usually requiring between 2 and 12 hours, more typically between 2 and 4 hours.

In typical yogurt producing processes, after the lengthy fermentation process has passed and the pH level has reached approximately 4.6, the mixture is cooled to about 35° F. to about 45° F., typically about 40° F., resulting in the final yogurt product. The yogurt is sent to a storage tank, and from the storage tank the yogurt is sent to be packaged for sale. Other components, such as fruit, flavoring, coloring or sweetener can optionally be added previous to storage, during storage, or between storage and packaging.

As previously described, the rate limiting step in yogurt production is the fermentation step. As such, considerable expense is accrued in this step of the production process. Faster fermentation processes are necessary to increase production plant capacity and to create cost savings during the manufacturing process. The present invention relates to a process whereby the time required for the fermentation step is greatly reduced. More specifically, the present invention relates to an acidification process that greatly decreases the fermentation time, often by as much as 50%. This process can be used in the production of any dairy fermented product such as yogurt.

In one embodiment of the invention, a process for the production of a yogurt food product using reduced fermentation time without compromise of product quality is provided. The process comprises the steps of heating a yogurt ingredient composition for about 2 minutes to about 12 minutes at a temperature of about 180° F. to about 200° F., cooling the yogurt composition to a temperature of about 105° F. to about 115° F., adding a bacterial culture to the yogurt composition, fermenting the yogurt composition at a temperature of about 105° F. to about 115° F. until the pH of the composition reaches about 4.8 to about 5.2, adding a food grade acid directly to the yogurt composition to reduce the pH to about 4.6 or less, and cooling the yogurt composition rapidly to a temperature of about 45° F. or lower. Thus, the acid may be added before or after cooling begins.

In another embodiment of the invention, a food grade acid is added directly to the yogurt composition to reduce the pH to about 4.6 or less, and then the yogurt composition is cooled rapidly to a temperature of about 45° F. or lower. Accordingly, the acid is added after cooling begins.

In yet another embodiment of the invention, the food grade acid is added at a temperature of about 105° F. to about 115° F. at the time of direct acidification. Subsequently, the yogurt composition is cooled rapidly to a temperature of about 45° F. or lower.

In any of the above-described embodiments of the invention the food grade acid may be any food grade acid known in the art, for example, the acid can be selected from the group consisting of food grade citric acid, lactic acid, malic acid, gamma delta lactone, tartartic acid, and combinations thereof. The bacteria used for fermentation of the yogurt composition may be any bacteria culture known in the art of yogurt production. Exemplary of such bacteria are Streptococcus thermophilus and Lactobacillus bulgaricus.

BRIEF DESCRIPTION OF THE DRAWINGS

FIG. 1 depicts the typical yogurt manufacturing process.
FIG. 2 depicts the improved method of yogurt production.

DETAILED DESCRIPTION OF THE INVENTION

As described above, the present invention relates to an improved yogurt producing process. More specifically, the present invention relates to a process of adding food grade acid(s) during or after the fermentation step, thereby decreasing the pH to the necessary level in significantly shorter time than used in conventional yogurt production processes. According to the present invention, the break pH of yogurt is reached by the combination of acid (mostly lactic acid) production by the culture bacteria and by the addition of food quality acid to the yogurt.

The method in accordance with the invention presents several advantages over previous practices in this field. The new process (fermentation+direct acidification) provides a method having a shorter time period necessary to reach a pH of about 4.6, thereby allowing higher productivity at the manufacturing plant, while producing a product with equal or better attributes such as flavor, texture, consistency, bacterial count or other organoleptic qualities. In addition, since acid addition occurs after pasteurization, the acid stream can be used for addition of heat-sensitive components without introducing undesirable pathogens and/or spoilage microorganisms. Further, since the present process only requires fermentation to a pH of about 5.2, the process of the present invention can utilize yogurt cultures which are not commercially feasible under present yogurt fermentation procedures.

During the fermentation step of the yogurt manufacturing process, the yogurt culture and other bacteria added by the manufacturer produce acid (mostly lactic acid). This acid causes the coagulation of proteins that are responsible for the development of the typical yogurt texture. For safety reasons, the coagulation must be carried out until the pH of the yogurt decreases to a pH of about 4.6. In conventional processes, this step can take from 2 to 12 hours depending on the yogurt culture used and how the culture was prepared. Mild cultures which are preferred for quality reasons require longer fermentation times.

The present method was designed to reduce the time necessary to reach a pH of about 4.6 by adding acid. This improved method of yogurt production is depicted in FIG. 2. In this process, the beginning production steps are similar (if not identical) to the conventional production steps depicted in FIG. 1 and described above. For example, a yogurt ingredient composition can be made by mixing dairy media as described above with ingredients that act as thickening agents/stabilizers such as hydrocolloids, including starch and gelatin, and whey protein concentrate. The mixture is then heated for about 2 to about 12 minutes (typically about 6 to about 8 minutes) at a temperature in the range of about 180° F. to about 200° F. to pasteurize and thicken the mixture and the mixture is cooled to about 105° F. to about 115° F. typically about 110° F.). The mixture is then placed into a fermentation tank and yogurt culture is added. The yogurt culture may contain any bacteria known in the art to be useful for dairy product fermentation, but Streptococcus thermophilus and Lactobacillus bulgaricus are preferred. The present method digresses from conventional methods at this point.

In conventional methods of yogurt manufacture, the fermentation proceeds at temperatures of about 105° F. to about 115° F. for the time necessary for the yogurt to reach a pH of about 4.6 or lower, which usually takes from 2 to 12 hours. In the present method, the fermentation is stopped (for example, by cooling) when the pH has only decreased to within the range of about 4.8 to about 5.2 (typically about 5.0). Using conventional yogurt production processes as shown in FIG. 1, a large portion of the fermentation time occurs while the pH is dropping from approximately 5.2 to the required pH of about 4.6 or less. Thus, by arresting the fermentation step at a pH of within about 4.8 to about 5.2, the present method provides a significant amount of fermentation time saved as compared to conventional processes.

For example, using the present method, yogurt can be made by adding a yogurt culture to the dairy medium, for example, along with any optional components, and letting the fermentation proceed until a pH of about 5.0 is reached, at which point food acid, preferably citric acid, would be added to the yogurt base to reach the final pH of about 4.6 (a pH of as low as 3.7 is contemplated in accordance with the invention). The yogurt made with this process can be made in approximately half the time, for example, 2 hours instead of 4 hours, that it would take if a pH of about 4.6 or less was reached only by fermentation. The yogurt product obtained by the combination of fermentation and direct acidification has equal or better attributes such as flavor, texture, consistency, bacterial count or other organoleptic qualities. For example, the yogurt compositions of the present invention unexpectedly have better attributes than the yogurt compositions described in Lundstet et al. (U.S. Pat. No. 4,416,905) which are fermented at 86° F. and then acidified.

The acid to be added during the fermentation process can be any acid appropriate for addition to foodstuffs. Exemplary of acids that can be added for direct acidification are lactic acid, citric acid, malic acid, gamma delta lactone, tartaric acid, acetic acid, or any other food grade acid, or combinations thereof.

As demonstrated in FIG. 2, the point at which the acid is added during the production process can vary. For example, the acid can be added 1) directly into the fermentation tank at or near the end of the fermentation process; 2) after the fermentation process has decreased the pH to the range of about 4.8 to about 5.2 (typically about 5.0), but before cooling of the mixture to about 38° F. to about 45° F.; 3) during or after cooling of the product, but before delivery of the mixture to the storage tank; or 4) after storage but before packaging. Further, the method of addition of the acid can vary. The acid can be added as a solution, mixed with the fruit prep, mixed with color or flavor additives, or in any other manner that is compatible with the yogurt production process. Further, this acidification step can be used in conjunction with a variety of yogurt fermentation conditions (i.e., relatively slight variations of temperatures, culture used, formula of the base, etc.). Furthermore, the final target pH can vary.

For purposes of the present invention, the fermentation process should be run at temperatures in the range of about 105° F. to about 115° F. until the target pH range of about 4.8 to about 5.2 is reached and the acidification step can be performed. Fermentation processes conducted outside of this range greatly decrease the speed at which the fermentation process occurs and eliminate the advantages in speed gained by addition of the acidification step.

After the fermentation process has been carried out and the pH level has reached approximately 4.6, the mixture is cooled to about 35° F. to about 45° F., typically about 40° F., resulting in the final yogurt product. The yogurt is sent to a storage tank, and from the storage tank the yogurt is sent to be packaged for sale.

Other components, such as fruit, flavoring, coloring or sweetener, including artificial sweeteners, can optionally be added previous to storage, during storage, or between storage and packaging. The fruit preparations can be fruit syrup, jams, marmalades, fruit preserves, fruit jelly, fruit sweetened fruit pulp, fruit concentrate, frozen fruits, and can include sugar, natural flavors, and colorants. The fruit preparation can be added before filling the yogurt into the pack, forming a visible deposit on the bottom, or the preparation can be added on top of the yogurt or can be stirred into the yogurt in a storage or process tank. Natural or synthetic sugars such as fructose, dextrose, corn syrup solids, lactose, aspartame, and sucrose may be used. Such sugars may be employed singly or in combination. Moreover, artificial sweeteners such as, for example, edible saccharin salts, dipeptide salts and the like may be used. The additives can be added before or after rapid cooling of the yogurt composition.

In addition to the above additives, the yogurt preparation of the present invention may include a wide variety of other additives. These additives include buffering agents, vitamins, minerals, appetite suppressants, preservatives, and the like. These additives should be present in amounts so as not to adversely affect the overall taste, appearance, and acceptability of the final yogurt food product.

The yogurt may be preserved by, for example, chemical or thermal preservation and by aseptic production methods. Chemical preservation may be accomplished by using preservatives such as sorbic acid to prevent growth of harmful yeasts and molds. Thermal preservation may be accomplished by storing the yogurt at temperatures that prevent the growth of harmful microorganisms.

U.S. Pat. No. 4,416,905 and 4,837,036 describe typical yogurt formulations and methods of production, respectively, and are expressly incorporated herein by reference. Conventional yogurt production methods were modified in accordance with this invention as described above. Experiments have shown that addition of citric acid when the yogurt reached a pH of about 5.0 allowed a reduction of the fermentation step by 50% and produced a product with similar texture and taste to the yogurt produced by fermentation alone without direct acidification. Further experiments confirmed that the present method of acidification reduced fermentation time by 40–50%, depending on dairy formulation, cultures chosen, etc. Starch may be increased by about 0.45% in the yogurt compositions of the present invention relative to a typical yogurt formulation to match the viscosity of the yogurt obtained by conventional means.

Various acids have been tried in the present production method. Citric, malic, lactic and gamma delta lactone alone and in combination were tested with citric acid alone being preferred. Bacteria counts were extensively tracked to determine the impact of the process of the present invention on bacterial counts. The present process had little or no impact on bacterial counts at the end of the shelf-life of the yogurt.

Previously used yogurt production processes rely on the production of lactic acid by the yogurt-culture to lower the pH below 4.6. Depending on the bacterial culture added and the method of addition of the culture (i.e., bulk or direct), the fermentation time is 2 to 12 hours, typically 2 to 4 hours. Using the yogurt cultures combined with the present acidification step, fermentation times have been dramatically shortened, usually by about half.

In the present process, yogurt is fermented with the bacterial culture until the pH of the yogurt reaches a pH of about 4.8 to about 5.2, typically about 5.0. Then a food grade acid, such as citric acid, is added to lower the pH to about 4.6 or less. This process reduced the fermentation time by about 50%, without negatively affecting flavor, texture and total bacteria counts. As shown in FIG. 2, it should be noted that the step of acidification can be performed prior to, during, or after the cooling step following fermentation of the yogurt to the pH range of about 4.8 to about 5.2. This process can be used in the production of any dairy fermented product, including yogurt, and can be used to produce any form of yogurt including a gel-like form, stirred yogurt, and drinking yogurt in a liquid form.

What is claimed is:

1. A process for production of a yogurt food product using reduced fermentation time without compromise of product quality said process comprising the steps of heating a yogurt ingredient composition for about 2 minutes to about 12 minutes at a temperature of about 180° F. to about 200° F.;

cooling the yogurt composition to a temperature of about 105° F. to about 115° F.;

adding a bacterial culture to the yogurt composition;

fermenting the yogurt composition at a temperature of about 105° F. to about 115° F. until the pH of the composition reaches about 4.8 to about 5.2;

adding a food grade acid directly to the yogurt composition to reduce the pH to about 4.6 or less; and cooling the yogurt composition rapidly to a temperature of about 45° F. or lower.

2. The process of claim 1 wherein the food grade acid is selected from the group consisting of citric acid, lactic acid, malic acid, gamma delta lactone, tartartic acid, and combinations thereof.

3. The process of claim 2 wherein the food grade acid is citric acid.

4. The process of claim 1 wherein the bacteria used for fermentation of the yogurt composition is selected from the group consisting of *Streptococcus thermophilus* and *Lactobacillus bulgaricus*.

5. The process of claim 1 further comprising the step of adding a thickening agent to the yogurt composition.

6. The process of claim 5 wherein the thickening agent is selected from the group consisting of whey protein, gelatin, and starch.

7. The process of claim 6 wherein the thickening agent is added to the yogurt composition before heating the yogurt composition to a temperature of about 180° F. to about 200° F.

8. The process of claim 1 further comprising the step of supplementing the yogurt composition with an additive selected from the group consisting of a fruit, a flavoring, a coloring, and a sweetener.

9. The process of claim 8 wherein the additive is added to the yogurt composition before rapid cooling of the yogurt composition.

10. The process of claim 8 wherein the additive is added to the yogurt composition after rapid cooling of the yogurt composition.

11. The process of claim 1 wherein the yogurt composition comprises milk or a milk product, whey protein, a starch component, a gelatin component, and a sweetener.

12. A process for production of a yogurt food product using reduced fermentation time without compromise of product quality said process comprising the steps of heating a yogurt ingredient composition for about 2 minutes to about 12 minutes at a temperature of about 180° F. to about 200° F.;

cooling the yogurt composition to a temperature of about 105° F. to about 115° F.;

adding a bacterial culture to the yogurt composition;

fermenting the yogurt composition at a temperature of about 105° F. to about 115° F. until the pH of the composition reaches about 4.8 to about 5.2;

adding a food grade acid directly to the yogurt composition to reduce the pH to about 4.6 wherein the yogurt composition is at a temperature of about 105° F. to about 115° F. at the time of direct acidification; and then cooling the yogurt composition rapidly to a temperature of about 45° F. or lower.

13. A process for production of a yogurt food product using reduced fermentation time without compromise of product quality said process comprising the steps of heating a yogurt ingredient composition for about 2 minutes to about 12 minutes at a temperature of about 180° F. to about 200° F.;

cooling the yogurt composition to a temperature of about 105° F. to about 115° F.;

adding a bacterial culture to the yogurt composition;

fermenting the yogurt composition at a temperature of about 105° F. to about 115° F. until the pH of the composition reaches about 4.8 to about 5.2;

adding a food grade acid directly to the yogurt composition to reduce the pH to about 4.6 or less; and then cooling the yogurt composition rapidly to a temperature of about 45° F. or lower.

\* \* \* \* \*